US005671293A

United States Patent [19]

Niki

[11] Patent Number: 5,671,293
[45] Date of Patent: Sep. 23, 1997

[54] PATTERN RECOGNIZING METHOD AND APPARATUS

[75] Inventor: Toru Niki, Yokohama, Japan

[73] Assignee: Canon Kabushiki Kaisha, Tokyo, Japan

[21] Appl. No.: 700,828

[22] Filed: Aug. 21, 1996

Related U.S. Application Data

[63] Continuation of Ser. No. 202,075, Feb. 25, 1994, abandoned.

[30] Foreign Application Priority Data

Feb. 26, 1993 [JP] Japan ................................. 5-038208
Feb. 10, 1994 [JP] Japan ................................. 6-016377

[51] Int. Cl.$^6$ ............................................ G06K 9/62
[52] U.S. Cl. ................................... 382/224; 382/190
[58] Field of Search .............................. 382/224, 225, 382/226, 228, 190, 197, 198, 205

[56] References Cited

U.S. PATENT DOCUMENTS

| 4,155,072 | 5/1979 | Kana ................................... 382/45 |
| 4,228,421 | 10/1980 | Asada ................................. 382/36 |
| 4,292,471 | 9/1981 | Kuhn et al. ...................... 382/36 |
| 4,319,221 | 3/1982 | Sakoe ................................. 382/36 |
| 4,503,557 | 3/1985 | Maeda ................................ 382/36 |

OTHER PUBLICATIONS

"A Data Clustering Algorithm For Feature Extraction & Unsupervised Learning", B.E. Gala, IEEE Proc. Of The Conf. On Computer Graphics, Pattern Recognition And Data Structure, May 14, 1975, pp. 323–331.

"Feature Evaluation And Sub-Class Determination Through Functional Mapping", M. Shridhar, Pattern Recognition Letters, vol. 3, No. 3, May 1985, pp. 155–159.

"Random Vectors And Their Properties", K. Fukunaga, Introduction To Statistical Pattern Recognition, 1994, pp. 11–50.

"Parametric Classifiers", K. Fukunaga, Introduction To Statistical Pattern Recognition, 1994, pp. 124–180.

Otsu, Nobuyuki, "Mathematical Studies on Feature Extraction in Pattern Recognition", Study Report of the Electrotechnical Laboratory, cover page, pp. 78–83, last page, Jul. 1981 (Japanese).

Otsu, Nobuyuki, "Mathematical Studies on Feature Extraction in Pattern Recognition", Study Report of the Electrotechnical Laboratory, English-language synopsis, Jul. 1981.

*Primary Examiner*—Yon J. Couso
*Attorney, Agent, or Firm*—Fitzpatrick, Cella, Harper & Scinto

[57] ABSTRACT

A pattern recognizing apparatus comprises a feature vector extractor to extract a feature vector of an input pattern; a converting unit to convert the feature vector extracted by the feature vector extractor into the feature vector which is effective for selection between categories; a classification processing unit for calculating an inner product with a predetermined basic vector for the converted vector after the conversion was performed by the converting unit; and a category selecting unit for selecting and outputting a category group to which the input pattern belongs with reference to a predetermined category table on the basis of the result of the calculation by the classification processing unit.

12 Claims, 9 Drawing Sheets

PATTERN RECOGNIZING METHOD AND APPARATUS

This application is a continuation of application Ser. No. 08/202,075 filed Feb. 25, 1994, now abandoned.

BACKGROUND OF THE INVENTION

1. Field of the Invention

The present invention relates to a pattern recognizing apparatus and, more particularly, to pattern recognizing method and apparatus having a function such that for an unknown input vector, by outputting a group of categories to which the input vector belongs, the number of candidate categories to which the input vector belongs can be reduced.

2. Related Background Art

In a conventional pattern recognizing apparatus, in the case where the number of categories as targets for recognition is very large, for an input vector, it is not compared with all of the standard patterns as candidates but there are executed processes such that a predetermined arithmetic operation of a small amount of calculations is executed first and a group of categories which can be determined such that the input vector belongs to such a category group are selected with reference to a table in accordance with the values of the results of the arithmetic operations and the categories included in the category group are output as candidates. Such processes are generally called a narrow-down or classification of the candidates. Since the number of candidate categories is reduced by such a classification process, the whole processing time can be reduced. Examples of such a classification will now be described in detail hereinbelow. FIG. 8 shows a construction of a conventional apparatus for recognizing characters. In the diagram, reference numeral 71 denotes an input unit for converting a document image as a target for recognition into an electric signal; 72 a feature extractor for extracting a feature that is peculiar to a character from an input signal from the input unit 71 every character and for producing a feature vector; 75 to 78 portions to execute a classification process; 76 a parameter memory in which parameters for the classification process have been stored; 75 a classification processing unit; 78 a category table; 77 a category table reference unit for referring to the category table 78 from the result of the classification process; 80 a dictionary in which standard patterns of all of the candidate categories as targets for recognition have been stored as mean vectors; 79 a comparator for selecting the category, as a recognition result, which gives the smallest distance between the standard vector in the dictionary 80 and the input vector; and 81 an output unit for outputting the candidate category which was finally selected by the comparator 79.

It is an object of the classification to reduce the number of categories which can become the candidates by a small calculation amount as small as possible. However, in general, even in case of the samples which belong to the same category, they are distributed so as to have a certain degree of variance. FIG. 9 is a diagram schematically showing a state of each category distribution in the case where the number of dimensions of the feature vector is set to 2. The sampling data is distributed to an area around the category mean vector while having variances such as C1, C2, . . . .

To narrow down the number of categories, there is considered a case of dividing the category by planes which perpendicularly cross in a space of FIG. 9 (generally, assuming that the number of dimensions of the feature vector is set to N, N-dimensional hyperplane). When considering the case of separating by the hyperplane, it is efficient to set the plane that is perpendicular to a direction such that the variance is as large as possible. Therefore, the main component is first analyzed for the mean vector of each category and upper L proper vectors among the proper vectors which are obtained as a result of the analysis are set to basic vectors $e_i$ (i=1, 2, . . . , L) of the hyperplane. The above proper vectors have the same values as those of the proper vectors of an inter-category covariance matrix $S_B$. The definition of the inter-category covariance matrix $S_B$ is given by the following equation.

$$S_B = (1/C) \sum_{k}^{c} = 1\ (\overline{X}(k) - X_T)(\overline{X}(k) - X_T)'$$

$\overline{X}(k)$: mean vector of a category k
$X_T$: whole mean vector of all samples
prime('): transposition value In the example of FIG. 9, four spaces $E_1$, $E_2$, $E_3$, and $E_4$ are obtained by the upper two basic vectors $e_1$ and $e_2$ (FIG. 10). The space to which each sample belongs is previously examined with respect to all of the study samples. In the case where even a small number of study samples are included in each space, it is regarded that the category to which the study samples belong is included in such a space, so that each space and the category to which the study samples belong are registered into a table.

For the input of an unknown feature vector X, an inner product operation with the basic vectors $e_i$ is performed by the classification process in the classification processing unit 75, the space to which X belongs is examined, and the above table is referred, so that the categories can be narrowed down. Only the categories which were narrowed down are compared with the dictionary 80 by the comparator 79. The optimum category is output by the output unit 81.

In the conventional method as mentioned above, however, there are drawbacks such that the intra-category covariance matrix is larger as compared with the inter-category covariance matrix and an anisotropy of the intra-category covariance matrix is strong, the number of categories included in the divided space is large, so that the number of categories cannot be efficiently narrowed down. FIG. 11 is a schematic diagram showing an example in such a case. Since an overlap between the categories is large, it is difficult to efficiently separate those categories by the hyperplane.

SUMMARY OF THE INVENTION

It is an object of the present invention to provide pattern recognizing method and apparatus which can efficiently narrow down the number of categories even in cases in consideration of the above problems.

According to the invention, after a conversion such that it becomes a feature that is effective for separation between categories was performed to a feature vector, an inner product operation with a predetermined basic vector is executed and a category table is referred. Due to this, the foregoing conventional problems can be solved and, even in a case as shown in FIG. 5, the number of categories can be efficiently narrowed down.

According to the invention, after a conversion such that a mean distribution matrix $S_w$ of each intra-category covariance matrix becomes a unit matrix was performed, the categories are separated by a hyperplane. Therefore, only the categories which are presumed such that an input vector belongs can be efficiently narrowed down from a number of candidate categories, so that there is an effect such that a pattern can be recognized by a smaller calculation amount.

DETAILED DESCRIPTION OF THE PREFERRED EMBODIMENT

An embodiment of the present invention will be described in detail hereinbelow with reference to the drawings.

Figure 1:
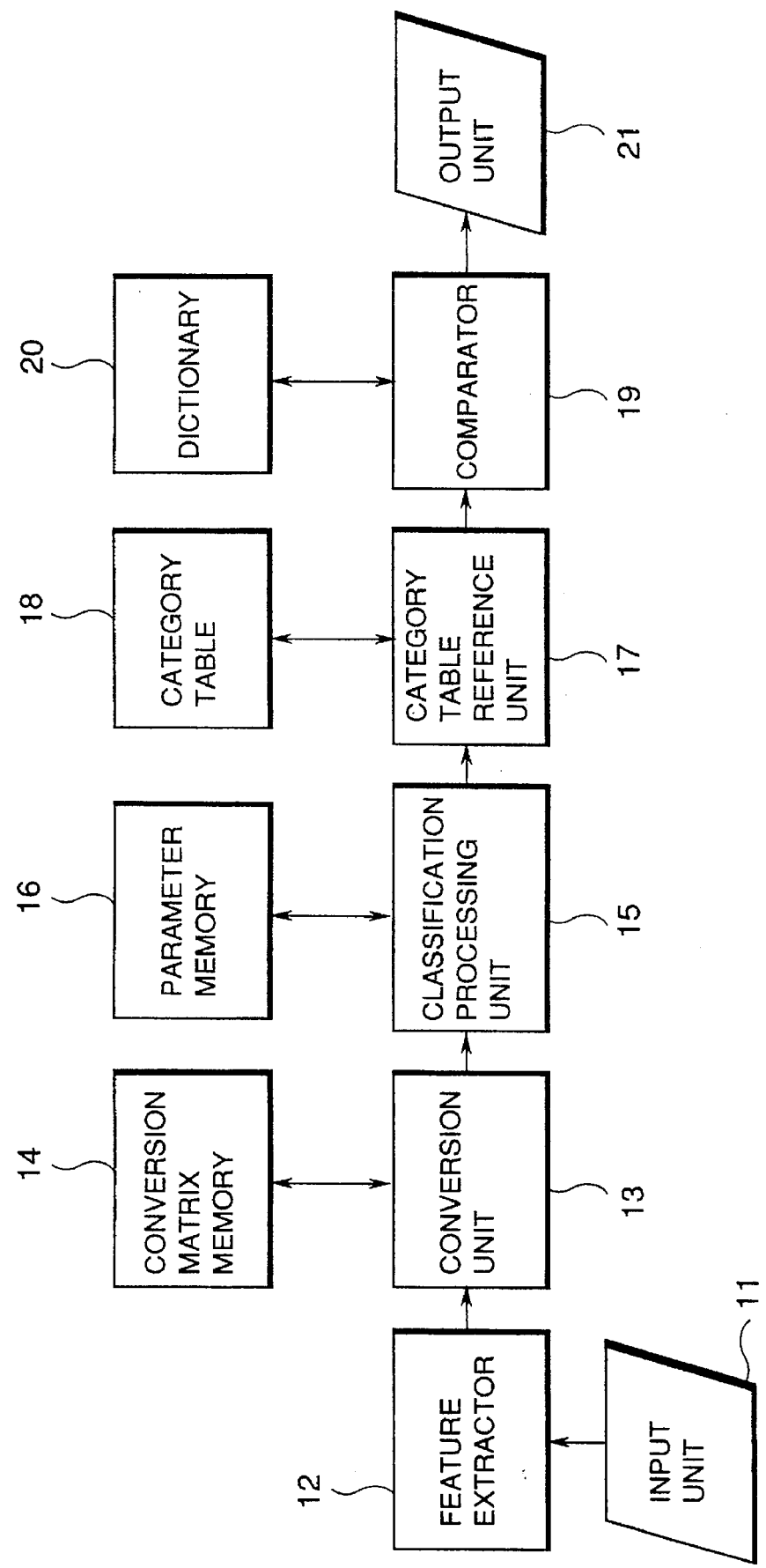
FIG. 1 is a block diagram showing a construction of a pattern recognizing apparatus of the first embodiment of the present invention.

FIG. 1 shows a construction of a pattern recognizing apparatus of an embodiment of the invention. In the diagram, reference numeral 11 denotes an input unit for converting a document image as a target for recognition into an electric signal; a feature extractor for extracting a feature that is peculiar to a character from an input signal from the input unit 11 every character and for producing a feature vector; 13 a conversion unit for acting a predetermined conversion matrix on an input vector, thereby converting; 14 a conversion matrix memory to store the conversion matrix; 15 to 18 portions for performing a classification process; 16 a parameter memory in which parameters for the classification process have been stored; 15 a classification processing unit; 18 a category table; 17 a category table reference unit for referring to the category table 18 from the result of the classification process; 20 a dictionary in which standard patterns of all candidate categories as targets for recognition have been stored as mean vectors; 19 a comparator for selecting the category which gives the smallest distance between the standard vector in the dictionary 20 and the input vector as a recognition result; and 21 an output unit for outputting the candidate category which was finally selected by the comparator 19.

Figure 10:
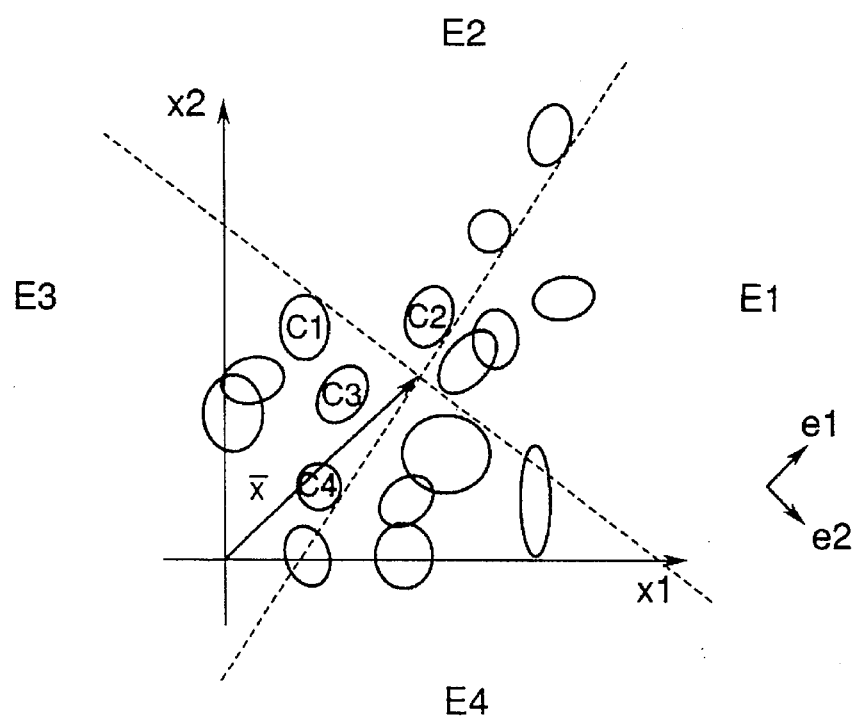
FIG. 10 is a schematic diagram for explaining the separation of categories in the conventional apparatus.
Figure 11:
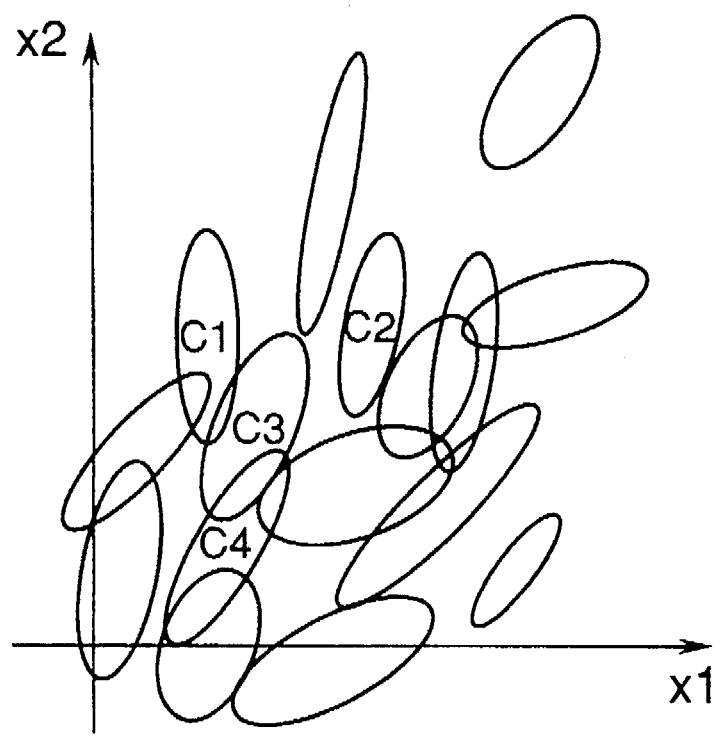
FIG. 11 is a schematic diagram showing an example in the case where it is difficult to separate categories.

First, a method of obtaining the conversion matrix as a main point of the invention and parameters for a classification process will be first described. In a case as shown in FIG. 10, since the intra-category covariance matrix is larger as compared with the inter-category covariance matrix and an anisotropy of the intra-category covariance is strong, according to the conventional technique, it is difficult to separate each category by a hyperplane. According to the embodiment, therefore, after a conversion such that the mean covariance matrix $S_w$ of each intra-category covariance matrix becomes a unit matrix was performed, the categories are separated by using a hyperplane.

The distribution of the category k is approximately expressed by a covariance matrix of the following equation.

$$S_W(k) = (1/n(k)) \sum_{i=1}^{n(k)} (X_i(k) - \overline{X}(k))(X_i(k) - \overline{X}(k))'$$

$\overline{X}(k)$: mean vector of the category k $n(k)$: the number of study samples of the category k On the other hand, for a covariance matrix $S_k$ (k=1, ..., C: C denotes the number of categories) of the category k, an intra-mean category covariance matrix $S_w$ is defined by the following equation.

$$S_W = (1/C) \sum_{k=1}^{C} S_k$$

Now, assuming that the number of dimensions of X is set to N, the following conversion is executed.

$$\dot{X} = AX \quad (X \in R^N, A : N \times N) \quad \ldots \quad (1)$$

$A = UM^{-\frac{1}{2}} U'$ (in this instance, $A' = A$)

dot (•): value after conversion prime ('): transposition value

M and U denote a proper value matrix and a proper vector matrix of $S_w$, respectively. That is, assuming that proper values of the intra-mean category covariance matrix $S_w$ are set to $\mu_1, \ldots, \mu_N$ and their proper vectors are set to $\phi_1, \ldots, \phi_N$, respectively, $M = \text{diag}(\mu_1, \ldots, \mu_N)$
$M^{-\frac{1}{2}} = \text{diag}(1/\sqrt{\mu_1}, \ldots, 1/\sqrt{\mu_N})$
$U = (\phi_1, \ldots, \phi_N)$ In this instance, it is defined by
$M^{-\frac{1}{2}} = \text{diag}(1/\sqrt{\mu_1}, \ldots, 1/\sqrt{\mu_N})$ From the definitions of the proper value matrix and the proper vector matrix,
$S_w = UMU'$
is obviously obtained. At this time, $$\begin{aligned}
\dot{S}_W &= A'S_W A \\
&= UM^{-\frac{1}{2}}U'S_W UM^{-\frac{1}{2}}U' \\
&= UM^{-\frac{1}{2}}U'UMU'UM^{-\frac{1}{2}}U' \\
&= UM^{-\frac{1}{2}}MM^{-\frac{1}{2}}U' \\
&= UU' \\
&= I
\end{aligned}$$

Figure 5:
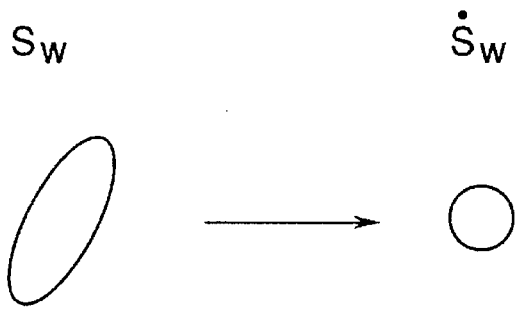
FIG. 5 is a conceptual diagram for explaining a state of conversion in the first embodiment.

It will be understood that, after the conversion of (1), the intra-mean category covariance matrix becomes a unit matrix as shown in FIG. 5.

Figure 6:
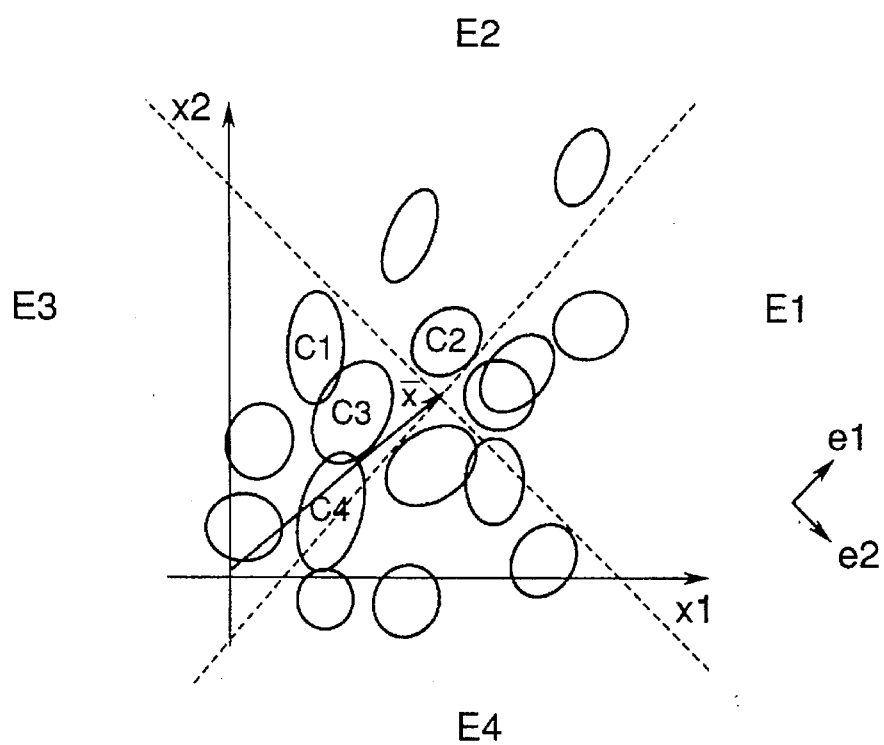
FIG. 6 is a schematic diagram for explaining the separation of categories according to the first embodiment.

FIG. 6 is a schematic diagram showing a state after completion of the conversion by A. It will be understood that according to the invention, since a grouping degree of each category is good, the separating process by the hyperplane can be more efficiently executed. The normalization itself of the covariance matrix to the unit matrix is a well-known technique called a white coloring process (reference literature: Noriyuki Ohtsu, "The Mathematical Study About the Feature Extraction in the Pattern Recognition", Study Report of The Electric Overall Laboratory, July, 1981).

The conversion matrix A is stored into the parameter memory 16. After all of the study samples were converted by the conversion matrix A, the whole mean vector $\dot{X}_T$ and the basic vectors $e_i$ indicative of the hyperplane to divide the space are obtained. The basic vectors $e_i$ are determined in substantially the same manner as the conventional method. That is, the main component is analyzed for the mean vector of each category and upper L proper vectors among the proper vectors which are obtained as a result of the analysis are set to the basic vectors $e_i$ (i=1, 2, ..., L) of the hyperplane. It is efficient to set the value of L to a large value in order to reduce the number of candidate categories. However, as the value of L is large, a category table, which will be explained hereinlater, increases. Therefore, L is experimentally set to a proper value. As a proper value of L in this instance, it is proper to set L to a value in a range from 1/d to 1/(d+10) of the number of dimensions of the feature vector, d being any integer. The values of $e_i$ and $\dot{X}_T$ obtained as mentioned above are stored into the parameter memory 16.

On the other hand, to which one of the divided spaces all of the study samples after the conversion belong is also previously examined. In the case where even a small number of study samples are included in each space, it is regarded that the category to which the study samples belong is included in such a space. Such a relation is registered into the category table 18.

Figure 7:
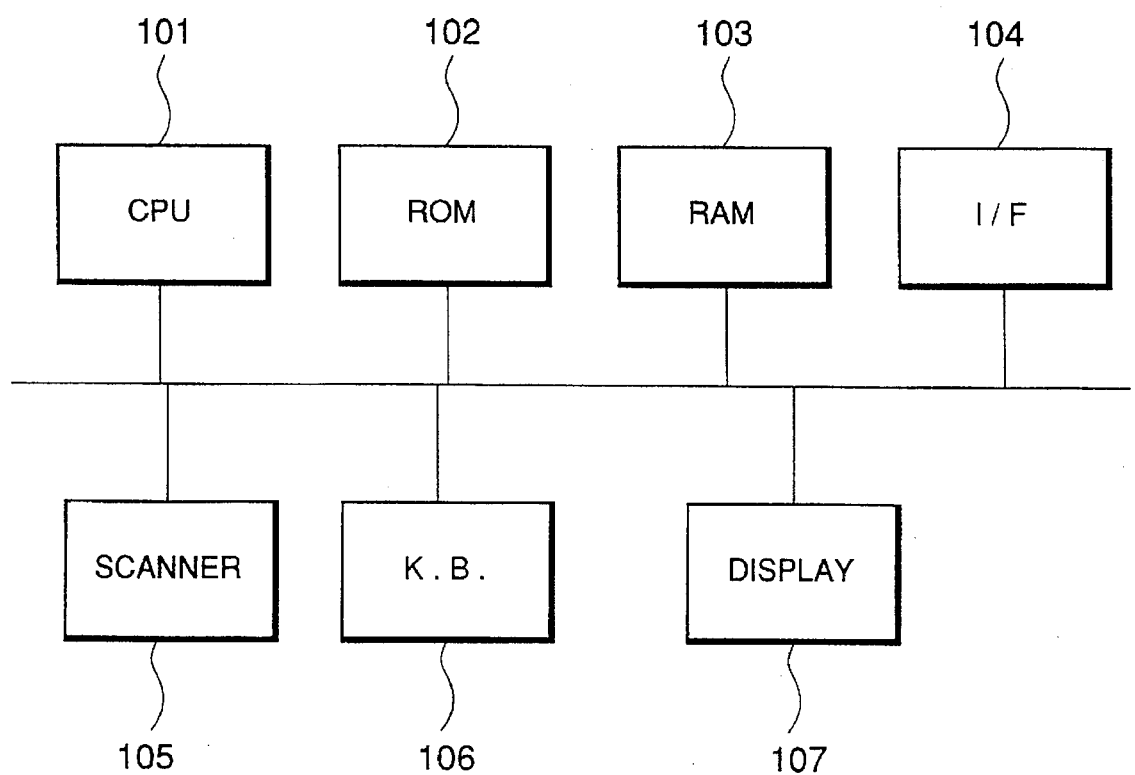
FIG. 7 is a constructional block diagram of the pattern recognizing apparatus of the embodiment.
Figure 8:
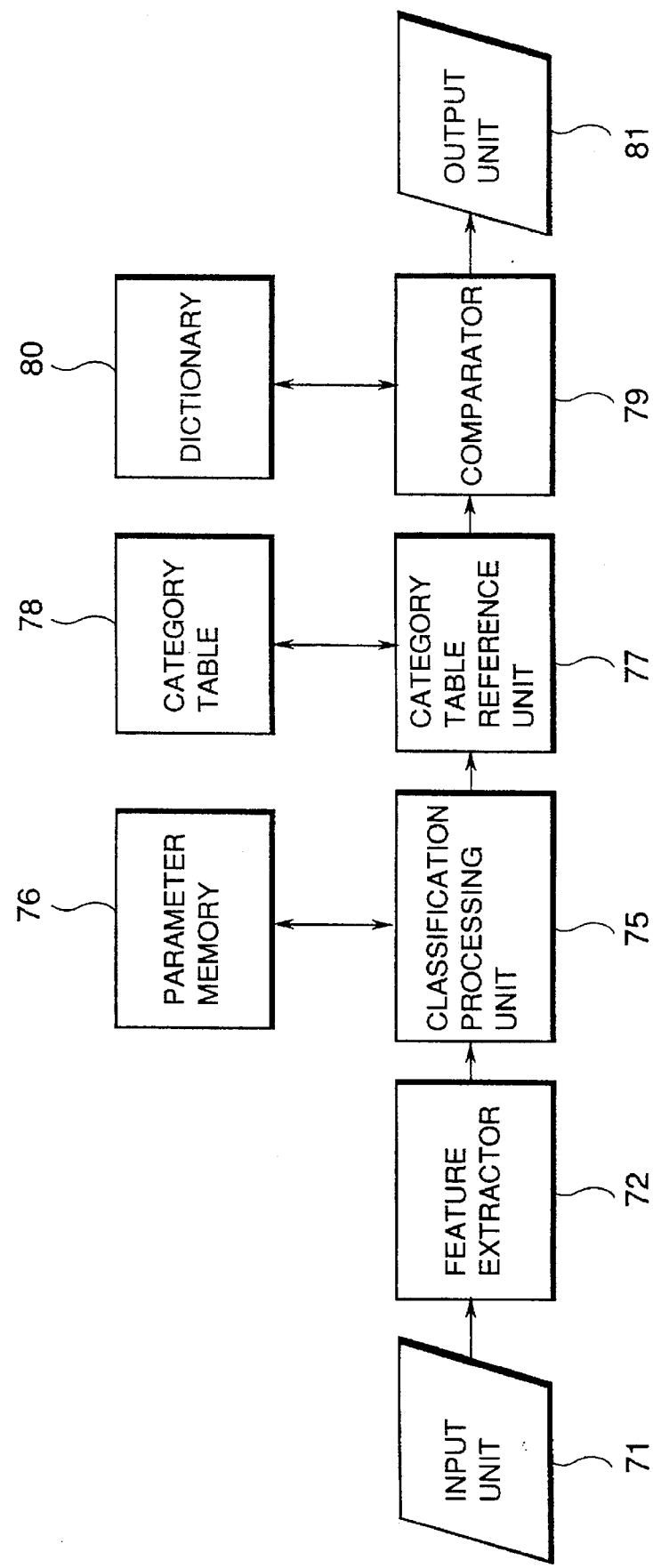
FIG. 8 is a block diagram showing a construction of a conventional pattern recognizing apparatus.
Figure 9:
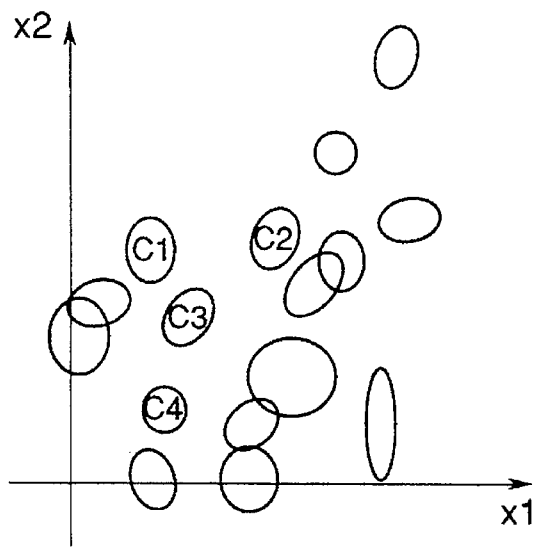
FIG. 9 is a schematic diagram for explaining the separation of categories in the conventional apparatus.

FIG. 7 is a constructional block diagram of a pattern recognizing apparatus as an example to embody the present invention.

Reference numeral 101 denotes a CPU to control the processes of the whole apparatus. The CPU 101 executes the processes on the basis of a control program stored in an ROM 102. The control program of the flowchart of FIG. 2, the dictionary, and the like are stored into the ROM 102. An RAM 103 is used as a working memory to store data during the execution of each process. Reference numeral 104 denotes an interface for controlling the communication between another pattern recognizing apparatus and a terminal of a computer or the like and for performing the image input from another apparatus, the output of the recognition result, and the like. Reference numeral 105 denotes a scanner to optically read the original image as a target for recognition; 106 an input unit such as keyboard, pointing device, or the like which can input a command for starting, interruption, instruction, or the like of various kinds of processes; and 107 a display such as CRT, liquid crystal, or the like for displaying the input image from the scanner or the like, recognition result, messages during the recognition, or the like.

Figure 2:
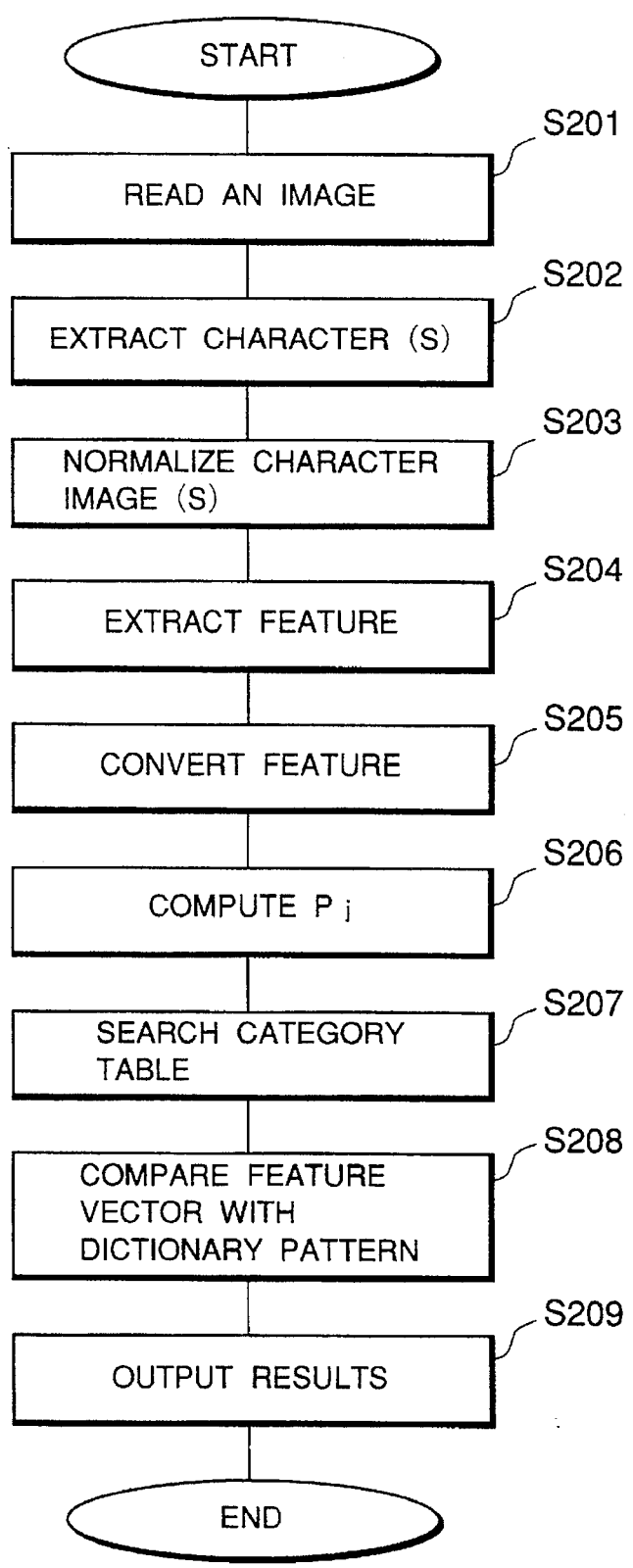
FIG. 2 is a flowchart for the first embodiment of the invention.
Figure 3:
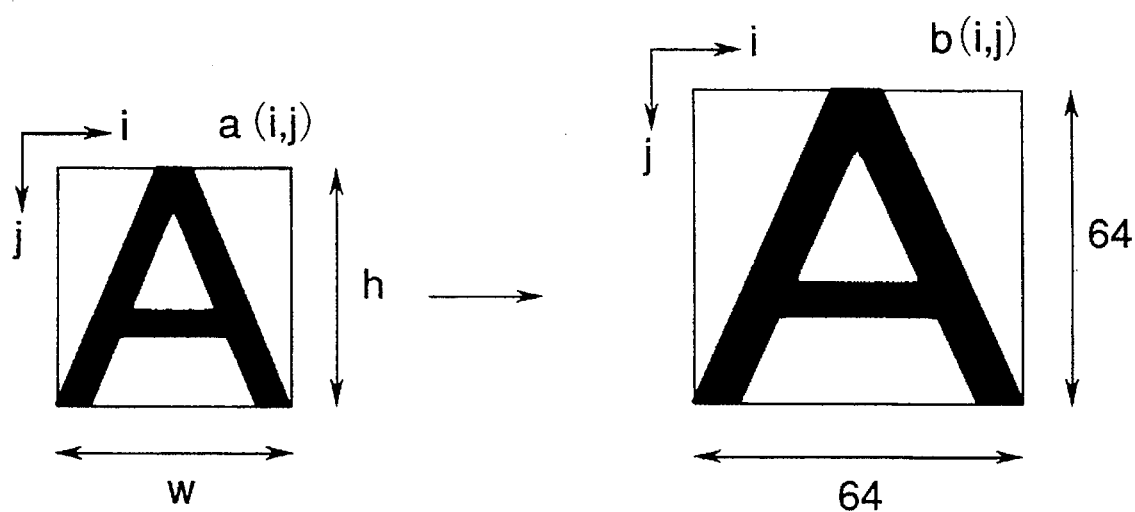
FIG. 3 is a diagram for explaining the normalization of a character image.

A flow of processes in the embodiment will now be described with reference to the flowchart of FIG. 2. In step S201, the document image is read by the scanner 105 and the image data is converted into the binary digital image data. In step S202, a character extracting process for extracting an area of every character is executed from the read-out image data. In step S203, the image data of one character is normalized into a predetermined size. For this purpose, a buffer memory for storing the normalized image data in which a predetermined length 64 is set to one side is prepared and the image data of one character is normalized and stored. Explanation will now be made specifically with reference to FIG. 3. The data of one character of the original image is expressed by a(i, j) ($0 \leq i < w$, $0 \leq j < h$). A height of character is set to h and a width is set to w. a(i, j) has a value of 1 for the black pixel and has a value of 0 for the white pixel. Now, assuming that the data after the normalization is set to b(i, j) ($0 \leq i, j < 64$), it is calculated by b(i, j)=a(64×i/h, 64×j/w)

(for all of the values of i and j which satisfy the relation of ($0 \leq i, j < 64$))

After the character image was normalized to the square in which a length of one side is equal to 64, the features are extracted in accordance with a predetermined algorithm in step S204. In the embodiment, the normalized character image is divided into (8×8) small areas, the number of black pixels is collected every small area, and a histogram is obtained. Since the number of black pixel is calculated for every 64 small areas, the 64-dimensional feature vector X is produced as a whole.

In step S205, the conversion matrix mentioned above is allowed to act on the obtained feature vector X, thereby obtaining the converted feature vector $\dot{X}$.

In step S206, by executing the following inner product operation to the feature vector $\dot{X}$ after completion of the conversion, values $p_1, p_2, \ldots, p_L$ to search the category table are obtained.

If $\phi_i \cdot (\dot{X} - \dot{X}_T) \geq 0$, $p_i = 1$
If $\phi_i \cdot (\dot{X} - \dot{X}_T) < 0$, $p_i = 0$
i=1, 2, ..., L)

The value $\gamma$ to refer to the category table is calculated by using $p_i$ as a result of the above inner product operation in accordance with the following equation.

$$\gamma = \Sigma^L_{i=1} p_i \cdot 2^{i-1}$$

Figure 4:
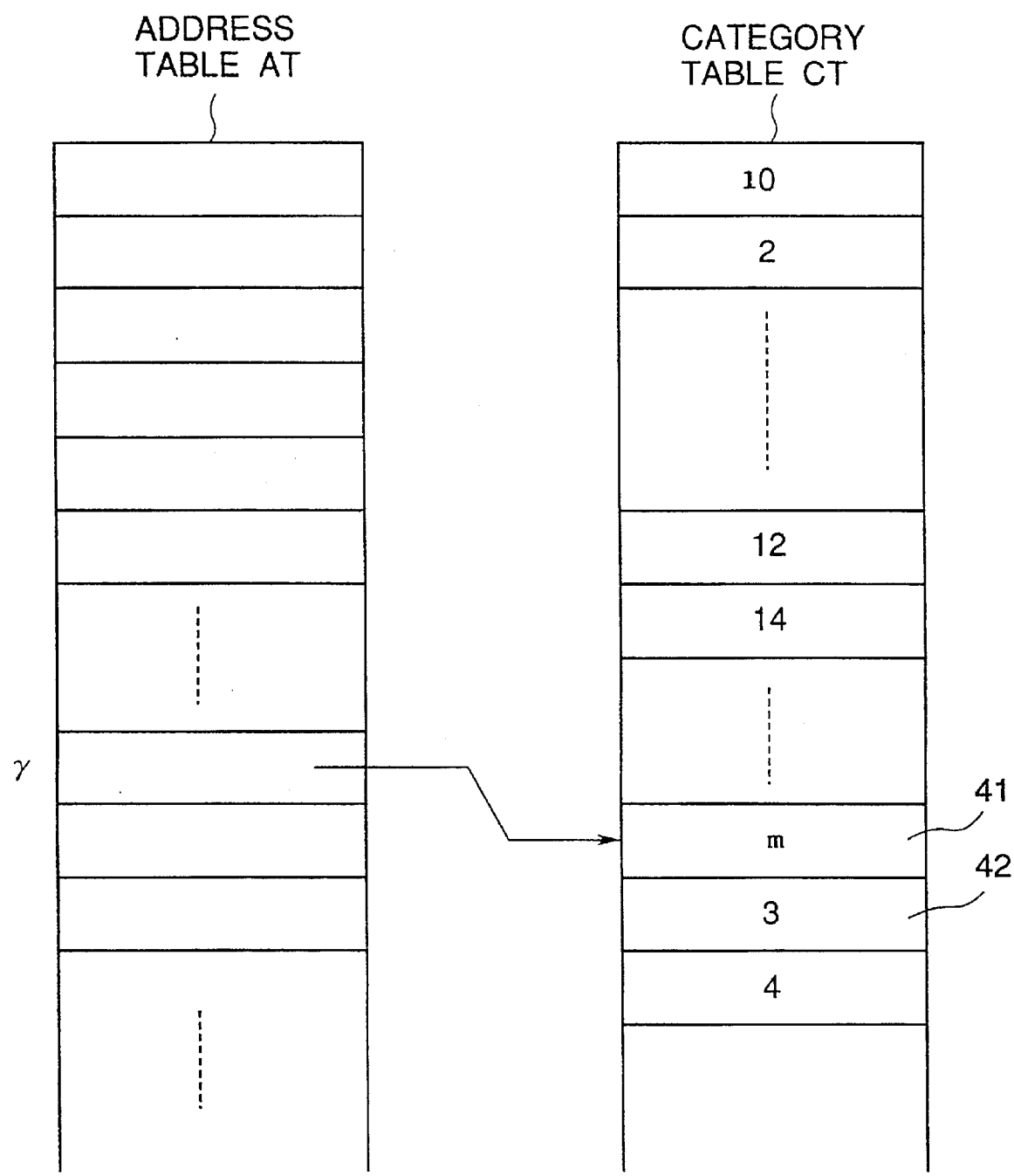
FIG. 4 is a memory map showing a structure of a category table in FIG. 1.

$\gamma$ has the values of 0 to $2^{L-1}$ indicative of the space to which $\dot{X}$ belongs. In step S207, the category table is searched by using $\gamma$. FIG. 4 shows a memory construction to explain the category table 18 in FIG. 1. From the value of $\gamma$, an address table AT[$\gamma$] is first referred. From the value of the address table AT[$\gamma$], a position 41 of a category table CT[0] is referred and the categories stored after the position 41 are set to the candidate categories. A number of m is stored at the first position 41. Subsequently, (m) codes indicative of the candidate categories are sequentially stored after a position 42. The number (m) is not constant but differs in dependence on each group. In the construction of FIG. 1, the address table AT is also stored in a predetermined area in the category table 18. The categories included in the category table CT are previously obtained by computing the reference value $\gamma$ for the study samples and by examining the space to which the value of $\gamma$ belongs.

Only for the (m) narrowed-down candidate categories, the feature vector is compared with the standard patterns stored in the dictionary in step S208. The category which gives the smallest distance is finally selected as a candidate category and is output in step S209.

As a second embodiment, there is a method of using only the elements of a high efficiency as a classification among the elements of the original feature vector as a conversion matrix. For the 64-dimensional feature vector similar to that in the first embodiment, a degree $R^{(j)}$ of a sole classification efficiency of a feature axis j is defined by the following equation.

$$R^{(j)} = \sigma^{(j)}_B / \sigma^{(j)}_W$$

where, $\sigma^{(j)}_B$ and $\sigma^{(j)}_W$ denote an inter-category variance by only the component of the feature axis and an intra-mean category variance, respectively.

$$\sigma_B^{(j)} = (1/C) \sum_{k=1}^{C} (x^{(j)}(k) - x_j^{(j)})^2$$

$$\sigma_W^{(j)} = (1/C) \sum_{k=1}^{C} \sigma_W^{(j)}(k)$$

$$\sigma_W^{(j)}(k) = (1/n(k)) \sum_{i=1}^{n(k)} (x_i^{(j)}(k) - \overline{x^{(j)}}(k))^2$$

$$\overline{x^{(j)}}(k) = (1/n(k)) \sum_{i=1}^{n(k)} x_i^{(j)}(k)$$

A new feature vector $\dot{X}$ is formed by only upper L feature amounts from a larger value of $R^{(j)}$. The process to calculate the inner product by using $\dot{X}$ and subsequent processes are substantially the same as those in the first embodiment.

The present invention intends to function to narrow down the category to which the input feature vector belongs for such an input feature vector and is not limited by the kind of input vector or category. The invention, therefore, can be applied to various recognition fields such as character, voice, image, and the like.

What is claimed is:

1. A pattern recognizing apparatus for selecting at least one category of pattern recognition candidates for an input pattern, the at least one category being selected from plural such categories of pattern recognition candidates, the apparatus comprising:

feature vector extracting means for extracting a feature vector of an input pattern;

converting means for converting the feature vector into a converted feature vector with a conversion matrix, wherein the conversion matrix is chosen such that it converts an intra-mean covariance matrix into a unit matrix, with the intra-mean covariance matrix determined from plural covariance matrices, each of the plural covariance matrices representing covariance between the pattern recognition candidates in one of the plural categories of pattern recognition candidates and a mean vector for that category;

classification processing means for determining an inner product between the converted feature vector and plural basic vectors, wherein each basic vector is a proper vector of the intra-mean covariance matrix determined when choosing the conversion matrix; and category selecting means for selecting the at least one category of pattern recognition candidates from a category table on the basis of the inner product, wherein the category table indicates whether regions of a hyperplane defined by the .basic vectors overlap onto categories converted by the conversion matrix.

2. An apparatus according to claim 1, wherein by comparing a pattern dictionary of pattern recognition candidates in said at least one category of pattern recognition candidates with said input pattern, the input pattern is recognized.

3. A pattern recognizing method for selecting at least one category of pattern recognition candidates for an input pattern, the at least one category being selected from plural such categories of pattern recognition candidates, the method comprising the steps of:

extracting a feature vector of an input pattern;

converting the feature vector into a converted feature vector with a conversion matrix, wherein the conversion matrix is chosen such that it converts an intra-mean covariance matrix into a unit matrix, with the intra-mean covariance matrix determined from plural covariance matrices, each of the plural covariance matrices representing covariance between the pattern recognition candidates in one of the plural categories of pattern recognition candidates and a mean vector for that category;

determining an inner product between the converted feature vector and plural basic vectors, wherein each basic vector is a proper vector of the intra-mean covariance matrix determined when choosing the conversion matrix; and selecting the at least one category of pattern recognition candidates from a category table on the basis of the inner product, wherein the category table indicates whether regions of a hyperplane defined by the basic vectors overlap onto categories converted by the conversion matrix.

4. A method according to claim 3, wherein by comparing a pattern dictionary of pattern recognition candidates in said at least one category of pattern recognition candidates with said input pattern, said input pattern is recognized.

5. A pattern recognizing apparatus for selecting at least one category of pattern recognition candidates for an unknown input pattern, the at least one category being selected from plural such categories of pattern recognition candidates, the apparatus comprising:

feature vector input means for inputting a feature vector of the unknown input pattern;

converting means for converting the feature vector into a converted feature vector with a conversion matrix, wherein the conversion matrix is chosen such that it converts an intra-mean covariance matrix into a unit matrix, with the intra-mean covariance matrix determined from plural covariance matrices, each of the covariance matrices representing covariance between the pattern recognition candidates in one of the plural categories of pattern recognition candidates and a mean vector for that category;

classification processing means for determining an inner product between the converted feature vector and plural basic vectors, wherein each basic vector is a proper vector of the intra-mean covariance matrix determined when choosing the conversion matrix; and category selecting means for selecting the at least one category of pattern recognition candidates from a category table on the basis of the inner product, wherein the category table indicates whether regions of a hyperplane defined by the basic vectors overlap onto categories converted by the conversion matrix.

6. An apparatus according to claim 6, wherein by comparing a pattern dictionary of pattern recognition candidates in said at least one category of pattern recognition candidates with said unknown input pattern, said unknown input pattern is recognized.

7. A pattern recognizing method for selecting at least one category of pattern recognition candidates for an unknown input pattern, the at least one category being selected from plural such categories of pattern recognition candidates, the method comprising the steps of:

inputting a feature vector of the unknown input pattern;

converting the feature vector into a converted feature vector with a conversion matrix, wherein the conversion matrix is chosen such that it converts an intra-mean covariance matrix into a unit matrix, with the intra-mean covariance matrix determined from plural covariance matrices, each of the covariance matrices representing covariance between the pattern recognition candidates in one of the plural categories of pattern recognition candidates and a mean vector for that category;

determining an inner product between the converted feature vector and plural basic vectors, wherein each vector for the converted feature vector performed by said converting means, the basic vector is a proper vector of the intra-mean covariance matrix determined when choosing the conversion matrix; and selecting the at least one category of pattern recognition candidates from a category table on the basis of the inner product, wherein the category table indicates whether regions of a hyperplane defined by the basic vectors overlap onto categories converted by the conversion matrix.

8. A method according to claim 7, wherein by comparing a pattern dictionary of pattern recognition candidates in said at least one category of pattern recognition candidates with said unknown input pattern, said unknown input pattern is recognized.

9. An apparatus according to claim 1, further comprising input means for inputting image data of an original as an electric signal and means for extracting the input pattern from the image data input by said input means.

10. An apparatus according to claim 5, further comprising input means for inputting image data of an original as an electric signal and means for extracting the input pattern from the image data input by said input means.

11. A method according to claim 3, further comprising an input step of inputting image data of an original as an electric signal and extracting the input pattern from the image data input by said input step.

12. A method according to claim 7, further comprising an input step of inputting image data of an original as an electric signal and extracting the input pattern from the image data input by said input step.

* * * * *

UNITED STATES PATENT AND TRADEMARK OFFICE
CERTIFICATE OF CORRECTION

PATENT NO. : 5,671,293

DATED : September 23, 1997

INVENTOR : Toru Niki

It is certified that error appears in the above-identified patent and that said Letters Patent is hereby corrected as shown below:

COLUMN 3

Line 40, "a feature" should read --12 a feature--.

COLUMN 6

Line 66, "axis and" should read --axis j and--.

COLUMN 8

Line 50, "claim 6," should read --claim 5,--.

Signed and Sealed this

Fourth Day of August, 1998

Attest:

BRUCE LEHMAN

Attesting Officer

Commissioner of Patents and Trademarks